(12) United States Patent
Chen et al.

(10) Patent No.: US 12,408,750 B2
(45) Date of Patent: Sep. 9, 2025

(54) SLIDE RAIL ASSEMBLY AND SLIDE RAIL THEREOF

(71) Applicants: King Slide Works Co., Ltd., Kaohsiung (TW); King Slide Technology Co., Ltd., Kaohsiung (TW)

(72) Inventors: Ken-Ching Chen, Kaohsiung (TW); Shun-Ho Yang, Kaohsiung (TW); Chih-Hsin Yeh, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 72 days.

(21) Appl. No.: 18/479,517

(22) Filed: Oct. 2, 2023

(65) Prior Publication Data

US 2024/0324767 A1    Oct. 3, 2024

(30) Foreign Application Priority Data

Mar. 27, 2023 (TW) .................................. 112111852

(51) Int. Cl.
| | |
|---|---|
| A47B 88/41 | (2017.01) |
| A47B 88/493 | (2017.01) |
| F16C 29/00 | (2006.01) |
| F16C 29/04 | (2006.01) |

(52) U.S. Cl.
CPC ............ *A47B 88/41* (2017.01); *A47B 88/493* (2017.01); *F16C 29/005* (2013.01); *F16C 29/04* (2013.01); *A47B 2210/0032* (2013.01)

(58) Field of Classification Search
CPC ...... A47B 88/41; A47B 88/487; A47B 88/493; A47B 2210/0032; F16C 29/04; F16C 29/005
USPC ............ 312/334.11, 334.17, 334.25, 334.26, 312/334.33, 334.38
See application file for complete search history.

(56) References Cited

U.S. PATENT DOCUMENTS

| 962,502 A | * | 6/1910 | Elmborg |
| 4,569,563 A | | 2/1986 | Fourrey |

(Continued)

FOREIGN PATENT DOCUMENTS

| CN | 201721351 U | | 1/2011 | |
| GB | 2061705 | * | 5/1981 | ............ A47B 88/10 |
| JP | S60-49118 A | | 3/1985 | |

(Continued)

*Primary Examiner* — James O Hansen
(74) *Attorney, Agent, or Firm* — Best & Flanagan LLP

(57) ABSTRACT

A slide rail assembly includes a first rail and a second rail. The first rail includes a first wall, a second wall and a first middle wall connected between the first and second walls. The second rail includes a first side wall, a second side wall and a second middle wall connected between the first and the second side walls. The first middle wall is arranged with a first ball groove, and the second rail further includes an extension wall including a first extension section, a second extension section and a first middle section connected between the first and second extension sections. The first extension section is extended from the first side wall, the second extension section is extended toward the second middle wall, and the first middle section is formed with a second ball groove. At least one rolling member is located between the first and second ball grooves.

10 Claims, 2 Drawing Sheets

(56) References Cited

U.S. PATENT DOCUMENTS

| | | | |
|---|---|---|---|
| 6,378,968 B1 * | 4/2002 | Weng | A47B 88/493 312/334.17 |
| 9,894,993 B2 | 2/2018 | Chen et al. | |

FOREIGN PATENT DOCUMENTS

| | | |
|---|---|---|
| JP | 2018-90119 A | 6/2018 |
| WO | 2008038472 A1 | 4/2008 |

* cited by examiner

SLIDE RAIL ASSEMBLY AND SLIDE RAIL THEREOF

BACKGROUND OF THE INVENTION

1. Field of the Invention

The present invention relates to a slide rail mechanism, and more particularly, to a slide rail assembly capable of improving structural strength and a slide rail thereof.

2. Description of the Prior Art

U.S. Pat. No. 9,894,993 B2 discloses a three-section slide rail assembly, which includes a first rail, a second rail and a third rail. The first rail has a first longitudinal body extended with a pair of first arms from both sides of the first longitudinal body. A first passage is defined by the pair of first arms and the first longitudinal body. Each of the first arms has a first ball raceway located in the first passage. The second rail is movable relative to the first passage of the first rail. The second rail has a second longitudinal body extended with a pair of second arms from both sides of the second longitudinal body. A second passage is defined by the pair of second arms and the second longitudinal body. Each of the second arms has a first arm section and a second arm section. The first arm section has a second inner ball raceway, and the second arm section has a second outer ball raceway. The third rail is movable relative to the second passage of the second rail. The third rail has a third longitudinal body extended with a pair of longitudinal supporting structures from both sides of the third longitudinal body. Each of the supporting structures comprises a first supporting arm and a second supporting arm. One of the first supporting arm and the second supporting arm has a third ball raceway facing toward the second inner ball raceway of the second rail.

However, in order to meet diverse requirements of the market, it is important to develop various products.

SUMMARY OF THE INVENTION

The present invention relates to a slide rail assembly capable of improving structural strength and a slide rail thereof.

According to an embodiment of the present invention, a slide rail assembly comprises a first rail, a first slide assisting device and a second rail. The first rail comprises a first wall, a second wall and a first middle wall connected between the first wall and the second wall. A passage is defined by the first wall, the second wall and the first middle wall. The slide assisting device is arranged in the passage of the first rail, and the slide assisting device comprising a first rolling member. The second rail is movable relative to the first rail. The second rail comprises a first side wall, a second side wall and a second middle wall connected between the first side wall and the second side wall. The first middle wall of the first rail is formed with a first ball groove. The second rail further comprises a first extension wall. The first extension wall comprises a first extension section, a second extension section and a first middle section connected between the first extension section and the second extension section. The first extension section is extended from the first side wall of the second rail, the second extension section is extended toward the second middle wall of the second rail, and the first middle section is formed with a second ball groove. The first rolling member is located between the first ball groove and the second ball groove.

Accordingly to another embodiment of the present invention, a slide rail comprises a first side wall, a second side wall and a middle wall. The middle wall is connected between the first side wall and the second side wall. The slide rail further comprises a first extension wall. The first extension wall comprises a first extension section, a second extension section and a first middle section connected between the first extension section and the second extension section. The first extension section is extended from the side wall, the second extension section is extended toward the middle wall, and the first middle section is formed with a ball groove. The slide rail further comprises a second extension wall. The second extension wall comprises a third extension section, a fourth extension section and a second middle section connected between the third extension section and the fourth extension section. The third extension section is extended from the second side wall, the fourth extension section is extended toward the middle wall, and the second middle section is formed with a ball groove.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
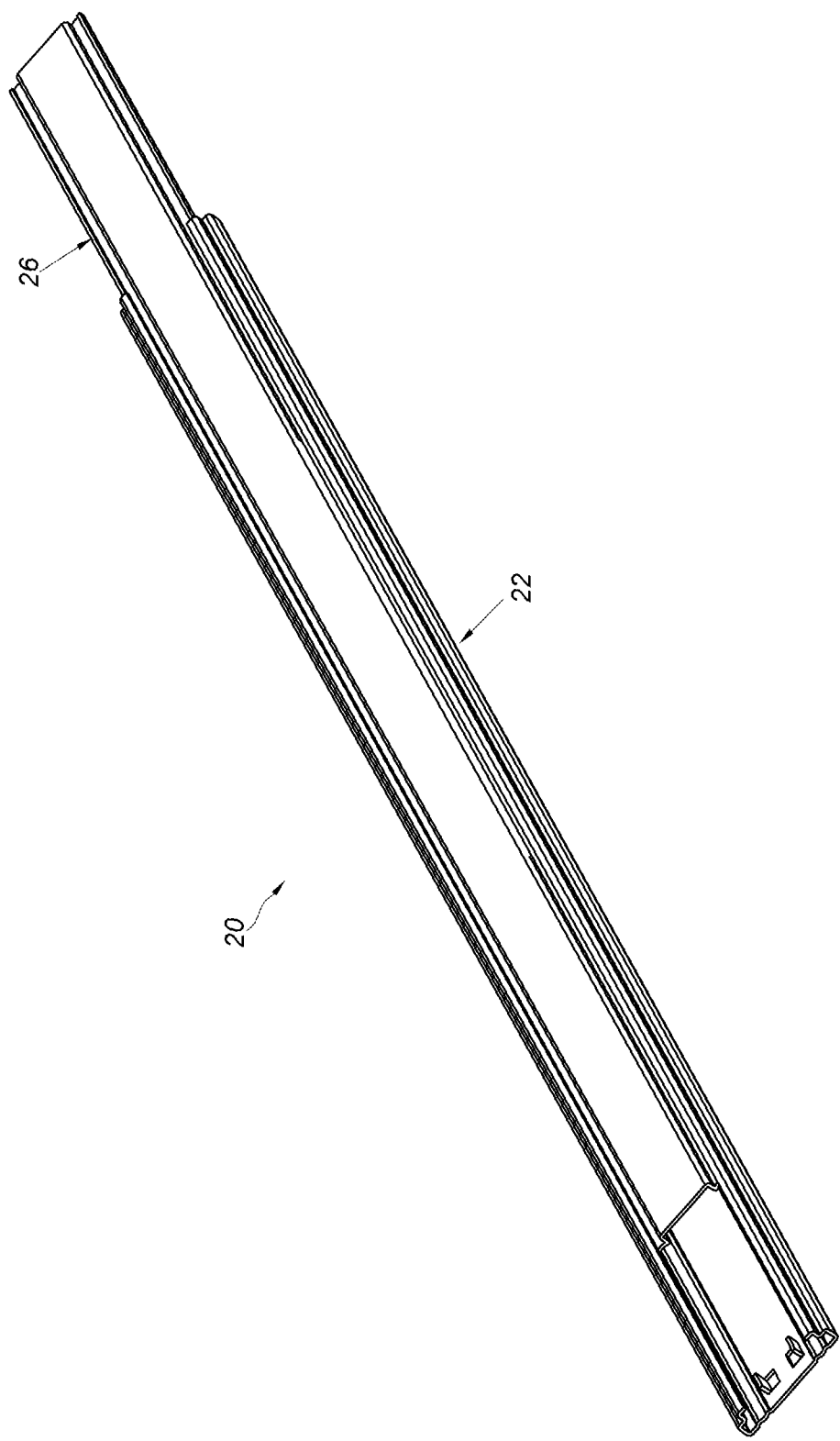
FIG. 1 is a diagram showing a slide rail assembly according to an embodiment of the present invention.
Figure 2:
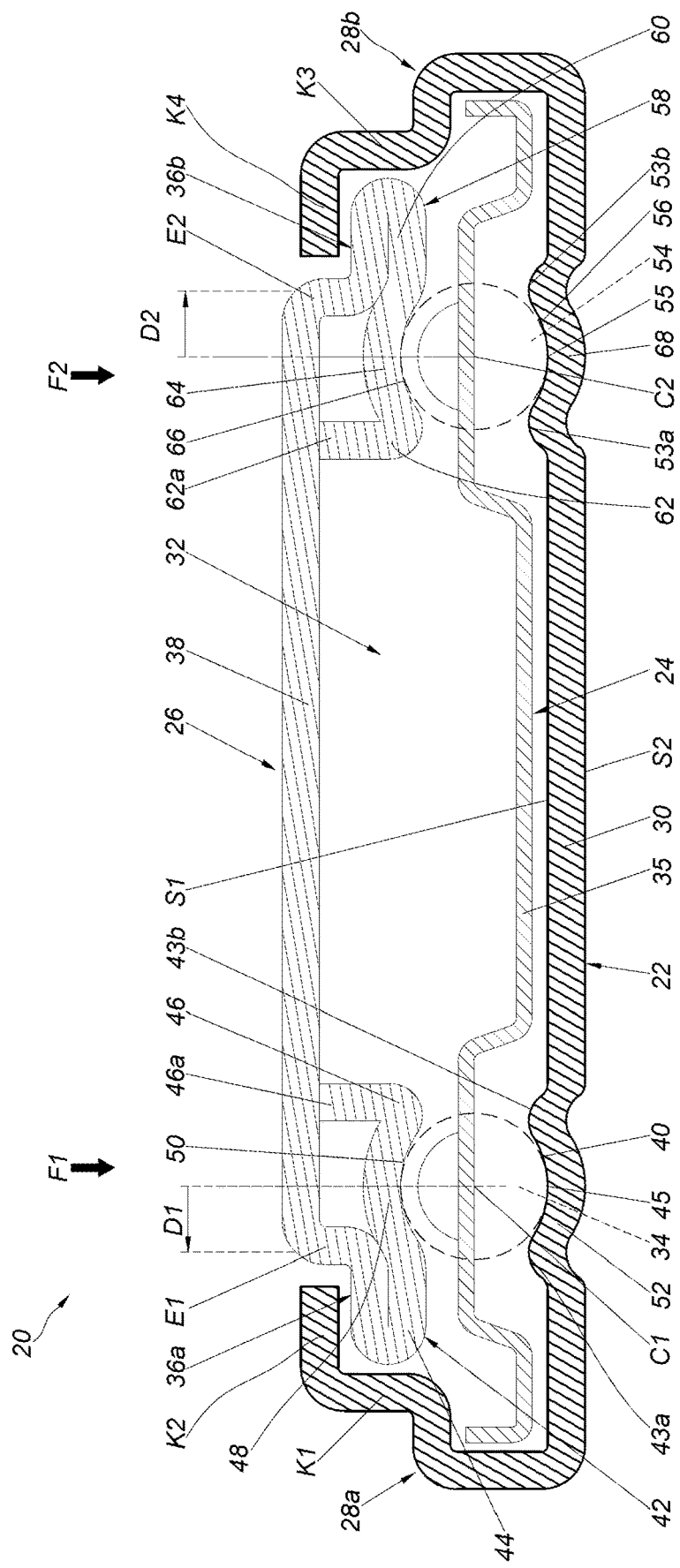
FIG. 2 is a cross-sectional view of the slide rail assembly according to the embodiment of the present invention.

As shown in FIG. 1 and FIG. 2, a slide rail assembly 20 comprises a first rail 22, a slide assisting device 24 and a second rail 26 according to an embodiment of the present invention. In the present embodiment, the first rail 22 is an outer rail, and the second rail 26 is an inner rail.

The first rail 22 comprises a first wall 28a, a second wall 28b and a first middle wall 30 connected between the first wall 28a and the second wall 28b. A passage 32 is defined by the first wall 28a, the second wall 28b and the first middle wall 30.

The slide assisting device 24 is arranged in the passage 32 of the first rail 22. The slide assisting device 24 comprises a first rolling member 34. In the present embodiment, the first rolling member 34 is a ball, but the present invention is not limited thereto. Preferably, the slide assisting device 24 further comprises a retainer 35 configured to mount the first rolling member 34.

The second rail 26 is movable relative to the first rail 22, and the second rail 26 comprises a first side wall 36a, a second side wall 36b and a second middle wall 38 connected between the first side wall 36a and the second side wall 36b.

The first middle wall 30 of the first rail 22 is formed with a first ball groove 40, and the second rail 26 further comprises a first extension wall 42. The first extension wall 42 comprises a first extension section 44, a second extension section 46 and a first middle section 48 connected between the first extension section 44 and the second extension section 46. The first extension section 44 is extended from the first side wall 36a of the second rail 26. One end 46a of the second extension section 46 is extended toward the second middle wall 38 of the second rail 26. The first middle section 48 is formed with a second ball groove 50. The first rolling member 34 is located between the first ball groove 40 and the second ball groove 50.

Preferably, the first wall 28a of the first rail 22 comprises a first supporting section K1 and a second supporting section K2 bent relative to the first supporting section K1. The second supporting section K2 is configured to hold the first side wall 36a of the second rail 26, in order to prevent the second rail 26 from being detached from the passage 32 of the first rail 22.

Preferably, the first extension section 44 is reversely folded from the first side wall 36a of the second rail 26, and the first extension section 44 is configured to abut against the first side wall 36a of the second rail 26. The first middle section 48 is adjacent to the first side wall 36a of the second rail 26. For example, a portion of the first middle section 48 is configured to abut against the first side wall 36a of the second rail 26. The end 46a of the second extension section 46 is configured to abut against the second middle wall 38 of the second rail 26.

Preferably, the second middle wall 38 of the second rail 26 has a first end part E1, and the first end part E1 is extended toward the second supporting section K2 of the first rail 22 along a first direction D1 and beyond a center position C1 of the first rolling member 34.

Preferably, the first rail 22 further comprises a first arc part 52 bent relative to the first middle wall 30. The first arc part 52 is formed with the first ball groove 40, and the second ball groove 50 of the first middle section 48 of the second rail 26 has an arc contour. The first rolling member 34 is in contact between the first ball groove 40 and the arc contour of the second ball groove 50 of the first middle section 48.

Preferably, the first middle wall 30 of the first rail 22 has a first surface S1 and a second surface S2 opposite to each other, and the first surface S1 faces toward the second rail 26. The first arc part 52 comprises a first shoulder section 43a, a second shoulder section 43b and a valley section 45 located between the first shoulder section 43a and the second shoulder section 43b. The shoulder sections 43a, 43b are protruded or raised relative to the first surface S1 of the first middle wall 30, so as to enhance structural strength of the first rail 22 (the first middle wall 30 of the first rail 22), and further improve stability of the first rolling member 34 located between the first ball groove 40 and the second ball groove 50.

Preferably, the slide assisting device 24 further comprises a second rolling member 54. In the present embodiment, the second rolling member 54 is a ball, but the present invention is not limited thereto. Preferably, the retainer 35 is configured to mount the second rolling member 54. The first middle wall 30 of the first rail 22 is further formed with a third ball groove 56, and the second rail 26 further comprises a second extension wall 58. The second extension wall 58 comprises a third extension section 60, a fourth extension section 62 and a second middle section 64 connected between the third extension section 60 and the fourth extension section 62. The third extension section 60 is extended from the second side wall 36b of the second rail 26. One end 62a of the fourth extension section 62 is extended toward the second middle wall 38 of the second rail 26. The second middle section 64 is formed with a fourth ball groove 66. The second rolling member 54 is located between the third ball groove 56 and the fourth ball groove 66.

Preferably, the second wall 28b of the first rail 22 comprises a third supporting section K3 and a fourth supporting section K4 bent relative to the third supporting section K3. The fourth supporting section K4 is configured to hold the second side wall 36b of the second rail 26, in order to prevent the second rail 26 from being detached from the passage 32 of the first rail 22. The second middle wall 38 of the second rail 26 has a second end part E2 opposite to the first end part E1, and the second end part E2 is extended toward the fourth supporting section K4 of the first rail 22 along a second direction D2 and beyond a center position C2 of the second rolling member 54. The second direction D2 is opposite to the first direction D1.

Preferably, the third extension section 60 is reversely folded from the second side wall 36b of the second rail 26, and the third extension section 60 is configured to abut against the second side wall 36b of the second rail 26. The second middle section 64 is adjacent to the second side wall 36b of the second rail 26. For example, a portion of the second middle section 64 is configured to abut against the second side wall 36b of the second rail 26. The end 62a of the fourth extension section 62 is configured to abut against the second middle wall 38 of the second rail 26.

Preferably, the first rail 22 further comprises a second arc part 68 bent relative to the first middle wall 30. The second arc part 68 is formed with the third ball groove 56, and the fourth ball groove 66 of the second middle section 64 of the second rail 26 has an arc contour. The second rolling member 54 is in contact between the third ball groove 56 and the arc contour of the fourth ball groove 66 of the second middle section 64.

Preferably, the second arc part 68 comprises a first shoulder section 53a, a second shoulder section 53b and a valley section 55 located between the first shoulder section 53a and the second shoulder section 53b. The shoulder sections 53a, 53b are protruded or raised relative to the first surface S1 of the first middle wall 30, so as to enhance structural strength of the first rail 22 (the first middle wall 30 of the first rail 22), and further improve stability of the second rolling member 54 located between the third ball groove 56 and the fourth ball groove 66.

Moreover, the second rail 26 is configured to carry a carried object (not shown in figures), and the carried object is configured to apply forces F1, F2 to two sides of the second rail 26 due to gravity. When the first force F1 is applied to a position adjacent to the first end part E1 of the second middle wall 38 of the second rail 26, through extending the second extension section 46 toward the second middle wall 38 of the second rail 26 (such as abutting against the second middle wall 38 of the second rail 26), entire structural strength or supporting strength of the second rail 26 (or the slide rail assembly 20) can be improved; furthermore, through extending the first end part E1 of the second middle wall 38 beyond the center position C1 of the first rolling member 34 along the first direction D1, the second middle wall 38 of the second rail 26 can be prevented from being deformed or damaged by the first force F1, such that the entire structural strength or supporting strength of the second rail 26 (or the slide rail assembly 20) can be further improved; furthermore, through reversely folding the first extension section 44 from the first side wall 36a of the second rail 26 with the first extension section 44 abutting against the first side wall 36a of the second rail 26, the entire structural strength or supporting strength of the second rail 26 (or the slide rail assembly 20) can be further improved; furthermore, through arranging the first arc part 52 of the first rail 22 to be bent relative to the first middle wall 30 for reinforcement, entire structural strength or supporting strength of the first rail 22 (or the slide rail assembly 20) can be improved; furthermore, through arranging the first shoulder section 43a and the second shoulder section 43b of the first arc part 52 to be protruded or raised relative to the first surface S1 of the first middle wall 30, the structural strength of the first rail 22 (the first middle wall 30 of the first rail 22) can be improved, so as to further improve stability of the first rolling member 34 located between the first ball groove 40 and the second ball groove 50.

Similarly, when the second force F2 is applied to a position adjacent to the second end part E2 of the second middle wall 38 of the second rail 26, through extending the fourth extension section 62 toward the second middle wall 38 of the second rail 26 (such as abutting against the second middle wall 38 of the second rail 26), the entire structural strength or supporting strength of the second rail 26 (or the slide rail assembly 20) can be improved; furthermore, through extending the second end part E2 of the second middle wall 38 beyond the center position C2 of the second rolling member 54 along the second direction D2, the second middle wall 38 of the second rail 26 can be prevented from being deformed or damaged by the second force F2, such that the entire structural strength or supporting strength of the second rail 26 (or the slide rail assembly 20) can be further improved; furthermore, through reversely folding the third extension section 60 from the second side wall 36b of the second rail 26 with the third extension section 44 60 abutting against the second side wall 36b of the second rail 26, the entire structural strength or supporting strength of the second rail 26 (or the slide rail assembly 20) can be further improved; furthermore, through arranging the second arc part 68 of the first rail 22 to be bent relative to the first middle wall 30 for reinforcement, the entire structural strength or supporting strength of the first rail 22 (or the slide rail assembly 20) can be improved; furthermore, through arranging the first shoulder section 53a and the second shoulder section 53b of the second arc part 68 to be protruded or raised relative to the first surface S1 of the first middle wall 30, the structural strength of the first rail 22 (the first middle wall 30 of the first rail 22) can be improved, so as to further improve stability of the second rolling member 54 located between the third ball groove 56 and the fourth ball groove 66.

An embodiment of the present invention further provides a slide rail, such as a slide rail identical to the second rail 26 having the aforementioned structural configuration. The technical features of the slide rail can refer to structural configuration of the second rail 26 shown in FIG. 2 and related descriptions. For simplification, no further illustration is provided.

Therefore, the slide rail assembly 20 and the slide rail thereof (such as the second rail 26) provided by the embodiments of the present invention can have better structural strength or supporting strength through the aforementioned technical features.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
a first rail comprising a first wall, a second wall and a first middle wall connected between the first wall and the second wall, a passage being defined by the first wall, the second wall and the first middle wall;
a slide assisting device arranged in the passage of the first rail, and the slide assisting device comprising a first rolling member; and
a second rail movable relative to the first rail, the second rail comprising a first side wall, a second side wall and a second middle wall connected between the first side wall and the second side wall;
wherein the first middle wall of the first rail is formed with a first ball groove, the second rail further comprises a first extension wall, the first extension wall comprises a first extension section, a second extension section and a first middle section connected between the first extension section and the second extension section, the first extension section is extended from the first side wall of the second rail, the second extension section is extended toward the second middle wall of the second rail, and the first middle section is formed with a second ball groove;
wherein the first rolling member is located between the first ball groove and the second ball groove;
wherein the first extension section is reversely folded from the first side wall of the second rail, and the second extension section is configured to abut against the second middle wall of the second rail.

2. The slide rail assembly of claim 1, wherein the first wall of the first rail comprises a first supporting section and a second supporting section bent relative to the first supporting section, and the second supporting section is configured to hold the first side wall of the second rail.

3. The slide rail assembly of claim 2, wherein the second middle wall of the second rail has a first end part, and the first end part is extended toward the second supporting section of the first rail and beyond a center position of the first rolling member.

4. The slide rail assembly of claim 1, wherein the first rail further comprises a first arc part bent relative to the first middle wall, the first arc part is formed with the first ball groove, and the first middle section of the second rail has an arc contour.

5. The slide rail assembly of claim 1, wherein the second wall of the first rail comprises a third supporting section and a fourth supporting section bent relative to the third supporting section, and the fourth supporting section is configured to hold the second side wall of the second rail.

6. The slide rail assembly of claim 5, wherein the slide assisting device further comprises a second rolling member; wherein the first middle wall of the first rail is further formed with a third ball groove, the second rail further comprises a second extension wall, the second extension wall comprises a third extension section, a fourth extension section and a second middle section connected between the third extension section and the fourth extension section, the third extension section is extended from the second side wall of the second rail, the fourth extension section is extended toward the second middle wall of the second rail, and the second middle section is formed with a fourth ball groove; wherein the second rolling member is located between the third ball groove and the fourth ball groove.

7. The slide rail assembly of claim 6, wherein the second middle wall of the second rail has a second end part, and the second end part is extended toward the fourth supporting section of the first rail and beyond a center position of the second rolling member.

8. The slide rail assembly of claim 7, wherein the third extension section is reversely folded from the second side wall of the second rail, and the fourth extension section is configured to abut against the second middle wall of the second rail.

9. The slide rail assembly of claim 7, wherein the first rail further comprises a second arc part bent relative to the first middle wall, the second arc part is formed with the third ball groove, and the second middle section of the second rail has an arc contour.

10. A slide rail assembly, comprising:
a first rail comprising a first wall, a second wall and a first middle wall connected between the first wall and the second wall, a passage being defined by the first wall, the second wall and the first middle wall;
a slide assisting device arranged in the passage of the first rail, and the slide assisting device comprising a first rolling member; and
a second rail movable relative to the first rail, the second rail comprising a first side wall, a second side wall and a second middle wall connected between the first side wall and the second side wall;
wherein the first middle wall of the first rail is formed with a first ball groove, the second rail further comprises a first extension wall, the first extension wall comprises a first extension section, a second extension section and a first middle section connected between the first extension section and the second extension section, the first extension section is extended from the first side wall of the second rail, the second extension section is extended toward the second middle wall of the second rail, and the first middle section is formed with a second ball groove;
wherein the first rolling member is located between the first ball groove and the second ball groove;
wherein the second wall of the first rail comprises a third supporting section and a fourth supporting section bent relative to the third supporting section, and the fourth supporting section is configured to hold the second side wall of the second rail;
wherein the slide assisting device further comprises a second rolling member; wherein the first middle wall of the first rail is further formed with a third ball groove, the second rail further comprises a second extension wall, the second extension wall comprises a third extension section, a fourth extension section and a second middle section connected between the third extension section and the fourth extension section, the third extension section is extended from the second side wall of the second rail, the fourth extension section is extended toward the second middle wall of the second rail, and the second middle section is formed with a fourth ball groove; wherein the second rolling member is located between the third ball groove and the fourth ball groove.

* * * * *